United States Patent
Mustonen et al.

(10) Patent No.: US 11,161,713 B2
(45) Date of Patent: Nov. 2, 2021

(54) REMOTE CONFIGURATION OF ELEVATORS, ESCALATORS AND AUTOMATIC DOORS

(71) Applicant: KONE Corporation, Helsinki (FI)

(72) Inventors: Matti Mustonen, Hyvinkää (FI); Jouko Kinnari, Helsinki (FI); Jani Hautakorpi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/821,451

(22) Filed: Nov. 22, 2017

(65) Prior Publication Data
US 2018/0162685 A1 Jun. 14, 2018

(30) Foreign Application Priority Data
Dec. 14, 2016 (EP) .................................. 16203960

(51) Int. Cl.
*B66B 1/34* (2006.01)
*B66B 5/00* (2006.01)
*E05F 15/00* (2015.01)
*B66B 25/00* (2006.01)

(52) U.S. Cl.
CPC .......... *B66B 1/3446* (2013.01); *B66B 1/3407* (2013.01); *B66B 5/0018* (2013.01); *B66B 25/00* (2013.01); *B66B 25/006* (2013.01); *E05F 15/00* (2013.01); *E05Y 2900/104* (2013.01); *G05B 2219/23297* (2013.01)

(58) Field of Classification Search
CPC ... B66B 1/3446; B66B 1/3407; B66B 25/006; B66B 25/00; B66B 5/0018; B66B 1/06; B66B 1/3415; B66B 27/00; E05F 15/00; E05Y 2900/104; G05B 2219/23297
USPC .......................................................... 700/275
See application file for complete search history.

(56) References Cited

U.S. PATENT DOCUMENTS 5,616,894 A * 4/1997 Nieminen ................. B66B 1/34
                                                              187/247
6,002,340 A * 12/1999 Smith ....................... G06F 1/26
                                                              340/3.4

(Continued)

FOREIGN PATENT DOCUMENTS

| JP | 2002-20052 A | 1/2002 |
| JP | 2008-168976 A | 7/2008 |
| JP | 2014-218326 A | 11/2014 |

OTHER PUBLICATIONS

Search Report issued in European priority application 16203960, dated May 22, 2017.

*Primary Examiner* — Kenneth M Lo
*Assistant Examiner* — Mohammed Shafayet
(74) *Attorney, Agent, or Firm* — Birch, Stewart, Kolasch & Birch, LLP

(57) ABSTRACT

There are provided measures for performing a configuration control in relation to an elevator, an escalator and automatic doors in a remote manner. Such measures exemplarily comprise determining a status of a component of said control apparatus, detecting whether a change with respect to said component has occurred based on said status, defining configuration parameters for said component, if it is detected that said change has occurred, and initiating transmission of said configuration parameters to said control apparatus.

10 Claims, 4 Drawing Sheets

(56) References Cited

U.S. PATENT DOCUMENTS

| | | | |
|---|---|---|---|
| 7,027,808 B2* | 4/2006 | Wesby | G06Q 40/00 455/419 |
| 7,395,359 B2* | 7/2008 | Reister | H04L 41/0809 709/220 |
| 7,699,142 B1* | 4/2010 | Wurth | B66B 5/0025 187/247 |
| 9,767,680 B1* | 9/2017 | Trundle | G05B 19/042 |
| 2002/0059412 A1* | 5/2002 | Azpitarte | G05B 19/042 709/223 |
| 2002/0112923 A1* | 8/2002 | Nakai | B66B 1/34 187/283 |
| 2003/0061384 A1* | 3/2003 | Nakatani | G05B 19/0423 709/245 |
| 2003/0217894 A1* | 11/2003 | Perala | B66B 5/0006 187/316 |
| 2004/0103176 A1* | 5/2004 | Schmid | H04L 41/0806 709/222 |
| 2005/0029055 A1* | 2/2005 | Deplazes | B66B 13/22 187/391 |
| 2006/0031435 A1* | 2/2006 | Tindal | H04L 41/0226 709/220 |
| 2006/0081421 A1* | 4/2006 | Lence | B66B 1/34 187/391 |
| 2006/0144646 A1* | 7/2006 | Engel | B66B 25/006 187/391 |
| 2006/0159007 A1* | 7/2006 | Frutiger | H04L 41/0806 370/216 |
| 2007/0169107 A1* | 7/2007 | Huttunen | H04L 29/06 717/174 |
| 2007/0261924 A1* | 11/2007 | Lindberg | B66B 1/34 187/391 |
| 2008/0126773 A1* | 5/2008 | Martinez | G06F 21/57 713/1 |
| 2008/0230326 A1* | 9/2008 | Tyni | B66B 5/0031 187/393 |
| 2009/0049441 A1* | 2/2009 | Mii | B66B 1/2458 717/173 |
| 2009/0177999 A1* | 7/2009 | Martinez | G06F 8/61 715/810 |
| 2009/0218178 A1* | 9/2009 | Lence-Barreiro | B66B 1/34 187/393 |
| 2009/0222497 A1* | 9/2009 | Ryan | G06F 8/65 |
| 2010/0082518 A1* | 4/2010 | Gaffga | G06F 9/44505 706/47 |
| 2013/0211547 A1* | 8/2013 | Buchdunger | G05B 19/0426 700/11 |
| 2013/0304234 A1* | 11/2013 | Szurek | G05B 19/02 700/28 |
| 2014/0156710 A1* | 6/2014 | VanGompel | H04L 67/12 707/803 |
| 2015/0160935 A1* | 6/2015 | Nye | H04L 41/0806 717/178 |
| 2015/0341210 A1* | 11/2015 | Ranbro | H04N 5/247 709/222 |
| 2016/0185569 A1* | 6/2016 | Sonnenmoser | B66B 5/0025 187/393 |
| 2017/0212487 A1* | 7/2017 | Gupta | F24F 11/62 |
| 2018/0069932 A1* | 3/2018 | Tiwari | G01S 5/0252 |
| 2018/0162685 A1* | 6/2018 | Mustonen | B66B 1/3407 |

* cited by examiner

REMOTE CONFIGURATION OF ELEVATORS, ESCALATORS AND AUTOMATIC DOORS

FIELD OF THE INVENTION

The present invention relates to a method, a device, a system, and a computer program product for performing a configuration control in relation to an elevator, an escalator and automatic doors (e.g., automatic building doors) in a remote manner.

RELATED BACKGROUND ART

The following description of background art and examples may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

Some examples of the present disclosure relate to elevators. An elevator may include a control board (e.g. a main control board) which may be damaged. Such damaged control board is to be exchanged, i.e. replaced by a working control board.

A replaced control board does not necessarily have to be damaged, and a replacing control board does not necessarily have to be identical to the replaced control board. Instead, the replaced control board may for example be replaced by a replacing control board having extended functionalities.

Further, such control board may include some software stored on a memory which is for example non-transitory and rewritable. Such software may be a firmware related to the control board. Such software may be updated to a new version.

In either of these cases, once respective hardware or software is exchanged, parameters of a working set-up need to be transferred to the new control board/software version. Configuration parameters are, for example, the following: main floor, closing speed of doors, and energy saving preferences (e.g. when to turn off car lights).

A usual approach is to upload these parameters to a maintenance tool/computer of a service person. The uploaded parameters may then be saved to a product and equipment data management database. Once respective hardware or software is exchanged, a restore of the parameters is done manually in a similar manner. In particular, the parameters may be loaded from the product and equipment data management database, and may then be downloaded from the maintenance tool/computer of the service person.

However, such restoring of the parameters due to exchange of a component is labor-intensive manual on-site work.

In particular, it is necessary that a technician enters the site and performs a procedure to restore parameters in order to enable the exchanged component (i.e., control board, software) to work properly and as expected.

Thus, the above procedure involves costs, and also time, during which the elevator may not be operable. Similar disadvantages may also occur in case of escalators or automatic doors.

SUMMARY OF THE INVENTION

Thus, it is an object of the present invention to overcome these disadvantages and to provide a method and a device for controlling an elevator, escalator or automatic doors by which costs and time required for configuring replaced components of the elevator, escalator or automatic doors can be reduced.

According to an exemplary aspect of the present invention, there is provided a method for remote managing a control apparatus controlling an elevator, an escalator, or automatic doors, the method comprising determining a status of a component of said control apparatus, detecting whether a change with respect to said component has occurred based on said status, defining configuration parameters for said component, if it is detected that said change has occurred, and initiating transmission of said configuration parameters to said control apparatus.

According to an exemplary aspect of the present invention, there is provided a device for remote managing a control apparatus controlling an elevator, an escalator, or automatic doors, the device comprising determining circuitry configured to determine a status of a component of said control apparatus, detecting circuitry configured to detect whether a change with respect to said component has occurred based on said status, defining circuitry configured to define configuration parameters for said component, if it is detected that said change has occurred, and initiating circuitry configured to initiate transmission of said configuration parameters to said control apparatus.

According to an exemplary aspect of the present invention, there is provided a device for remote managing a control apparatus controlling an elevator, an escalator, or automatic doors, the device comprising determining means for determining a status of a component of said control apparatus, detecting means for detecting whether a change with respect to said component has occurred based on said status, defining means for defining configuration parameters for said component, if it is detected that said change has occurred, and initiating means for initiating transmission of said configuration parameters to said control apparatus.

According to an exemplary aspect of the present invention, there is provided a device for remote managing a control apparatus controlling an elevator, an escalator, or automatic doors, the device comprising a memory configured to store computer program code, and a processor configured to read and execute computer program code stored in the memory, wherein the processor is configured to cause the apparatus to perform determining a status of a component of said control apparatus, detecting whether a change with respect to said component has occurred based on said status, defining configuration parameters for said component, if it is detected that said change has occurred, and initiating transmission of said configuration parameters to said control apparatus.

According to an exemplary aspect of the present invention, there is provided a system comprising a device according to any of the device related aspects of the present invention mentioned above and a control apparatus controlling an elevator, an escalator, or automatic doors, wherein said control apparatus is configured to receive said configuration parameters, and to effect a local parameter manipulation with respect to said component based on said configuration parameters.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

It is to be noted that the following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

General elements and functions of elevators, escalators and automatic doors, details of which also depend on the actual type of elevator, escalators and automatic doors, are known to those skilled in the art, so that a detailed description thereof is omitted herein. However, it is to be noted that several additional devices and functions besides those described below in further detail may be employed in such elevators, escalators and automatic doors and corresponding systems.

Figure 1:
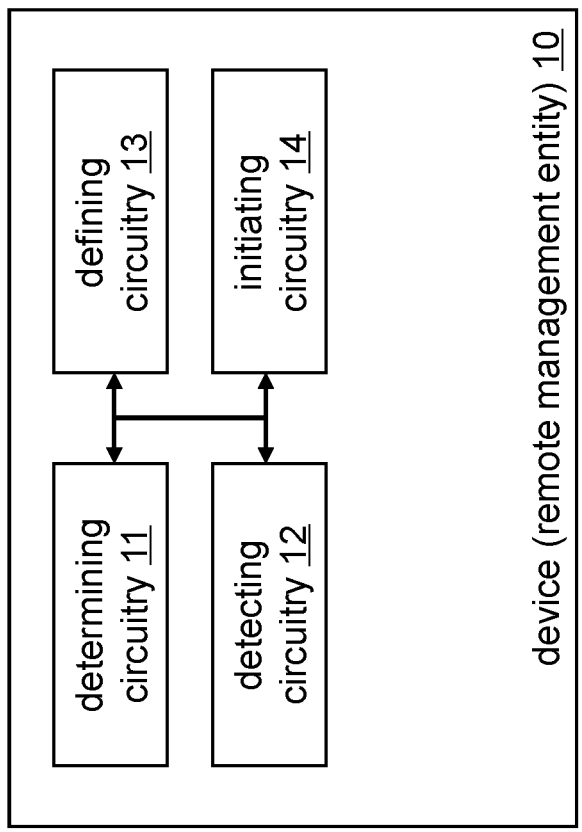
FIG. 1 is a block diagram illustrating a device according to exemplary embodiments of the present invention.

FIG. 1 shows a schematic diagram illustrating a configuration of a remote management device 10 (where some examples of embodiments are implementable) for managing a control apparatus controlling an elevator, and escalator, or automatic doors. In particular, the remote management device 10 comprises a determining circuitry 11, a detecting circuitry 12, a defining circuitry 13, and an initiating circuitry 14. The determining circuitry 11 determines a status of a component of said control apparatus. The detecting circuitry 12 detects whether a change with respect to said component has occurred based on said status. The defining circuitry 13 defines configuration parameters for said component, if it is detected (by the detecting circuitry 12) that said change has occurred. The initiating circuitry 14 initiates transmission of said configuration parameters to said control apparatus.

Figure 2:
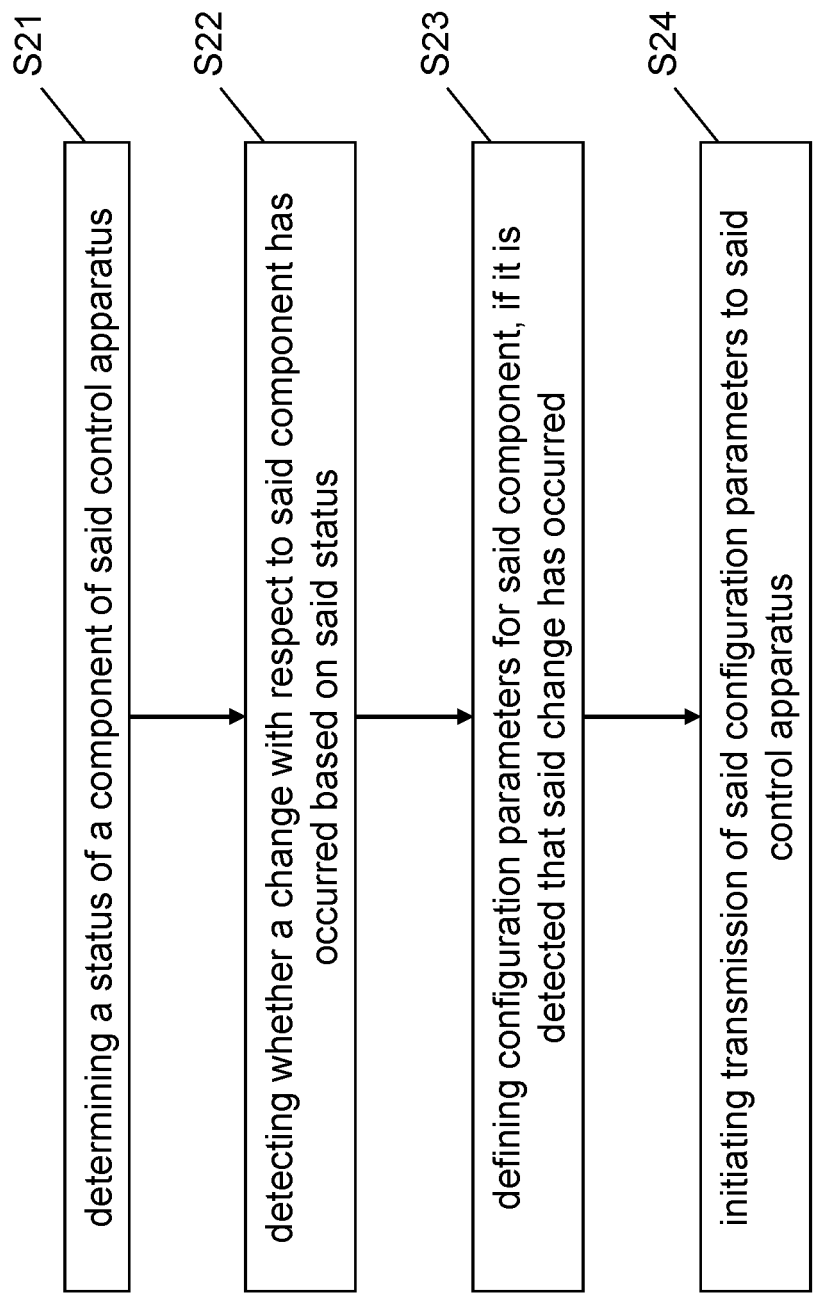
FIG. 2 is a schematic diagram of a procedure according to exemplary embodiments of the present invention.

The remote management device 10 shown in FIG. 1 may be configured to carry out a method as illustrated in FIG. 2.

In step S21, a status of a component of said control apparatus is determined. In step S22, it is detected whether a change with respect to said component has occurred based on said status. In step S23, configuration parameters for said component are defined, if it is detected (in step S22) that said change has occurred. In step S24, a transmission of said configuration parameters to said control apparatus is initiated.

Configuration parameters are, for example, a reference to the main floor, closing speed of doors, and energy saving preferences (e.g. when to turn off car lights).

According to some embodiments of the present invention, in said defining step S23, the configuration parameters for said component are retrieved from a configuration information storage storing said configuration parameters.

Such configuration information storage may be any entity which is enabled to store such configuration information (i.e., configuration parameters), and may be a part of the remote management device, or may be a separate device accessible by the remote management device (e.g. by means of a network connection).

According to some embodiments of the present invention, local configuration parameters for said component are received from the control apparatus. Further, the local configuration parameters for said component are stored in said configuration information storage.

In this regard it is noted that local configuration parameters are configuration parameters that are present on site, that is, that are present at the control apparatus of e.g. the elevator. More particularly, the control apparatus of e.g. the elevator is configured with these local configuration parameters at the time of the receiving by the remote managing device (i.e., at the time of the transmission by the control apparatus of e.g. the elevator).

It is further noted that this receiving (and transmitting on the other end of communication) and storing is performed in a cyclical manner. In addition, these steps may be triggered by any other controlling entity, e.g. an operator, or a logic unit analyzing any events regarding the control apparatus.

According to some embodiments, the change is a replacement of a hitherto component by a replacement component as the component. In other words, the change may be for example the replacement of a defect control board or the update of a firmware to a newer version.

According to some embodiments, local configuration parameters for said replacement component are received from said control apparatus, wherein the local configuration parameters for said replacement component are indicative of said replacement. Further, occurrence of said change is detected based on said local configuration parameters for said replacement component.

The local configuration parameters for said replacement component may be indicative of said replacement in that the local configuration parameters for said replacement component are default configuration parameters or differ from said configuration parameters stored in said configuration information storage by at least a predetermined difference.

This difference may for example be a bit indicative of either a default configuration or a customized configuration.

Alternatively, the difference may for example be a deviation from a stored customized parameter value by more than a predetermined amount.

According to some embodiments, the component is any of a software component or a hardware component of said control apparatus, i.e., for example, a control board or a firmware.

In other words, according to some embodiments of the present invention, all elevator parameters (including drive parameters and commissioning/set-up data) are saved periodically to a server in a maintenance center (e.g. the remote management device 10) via remote connectivity.

A replacement board, newly installed in an elevator and now missing the commissioning parameters, is noticed by the remote maintenance center. This may for example be effected by receipt of a set of operating parameters from the replacement board being booted, when the set of parameters being that of a newly installed board or otherwise different from the latest set sent from that elevator.

Then, the latest parameter configuration is downloaded towards the replacement board automatically. The same applies upon a software update, as the new version only has default parameters.

Thus, according to embodiments of the present invention, a remote re-configuration is effected, so that a change in an apparatus such as an elevator, escalator or automatic doors can be quickly established. Hence, costs and time required for such maintenance actions can be reduced.

The control board e.g. of an elevator (i.e., the control apparatus) may support many communication interfaces simultaneously, e.g. via a local maintenance tool (operated by service personnel on-site) and remote connectivity with a maintenance center (e.g. remote management device 10). These interfaces may enable setting and changing of elevator parameters. When a local and remote interface is used at the same time, a parameter may be changed simultaneously from two locations. It needs to be made clear to the overruled party that no changes to the parameters are allowed at the moment. In other words, in such case, it needs to be controlled which write attempt is done, and the other interface needs to be informed that it does not have write access.

In software technologies, it is known to use a semaphore to give exclusive access to a resource.

According to some embodiments of the present invention, when initiating said transmission (of the configuration parameters to the control apparatus, i.e., upon step S24), a transmission of a priority indication to said control apparatus is initiated (see step S31 of FIG. 3), said priority indication indicates that upon remote parameter manipulation by said transmission of said configuration parameters and local parameter manipulation at the same time, said remote parameter manipulation is overriding said local parameter manipulation.

In other words, according to some embodiments of the present invention, when a remote parameter access is done, the local interface actions are cancelled and the local user is notified that remote access has higher priority. The parameters are reloaded/updated in the local interface to enable fresh and updated values to be shown to a local user for further actions.

Figure 3:
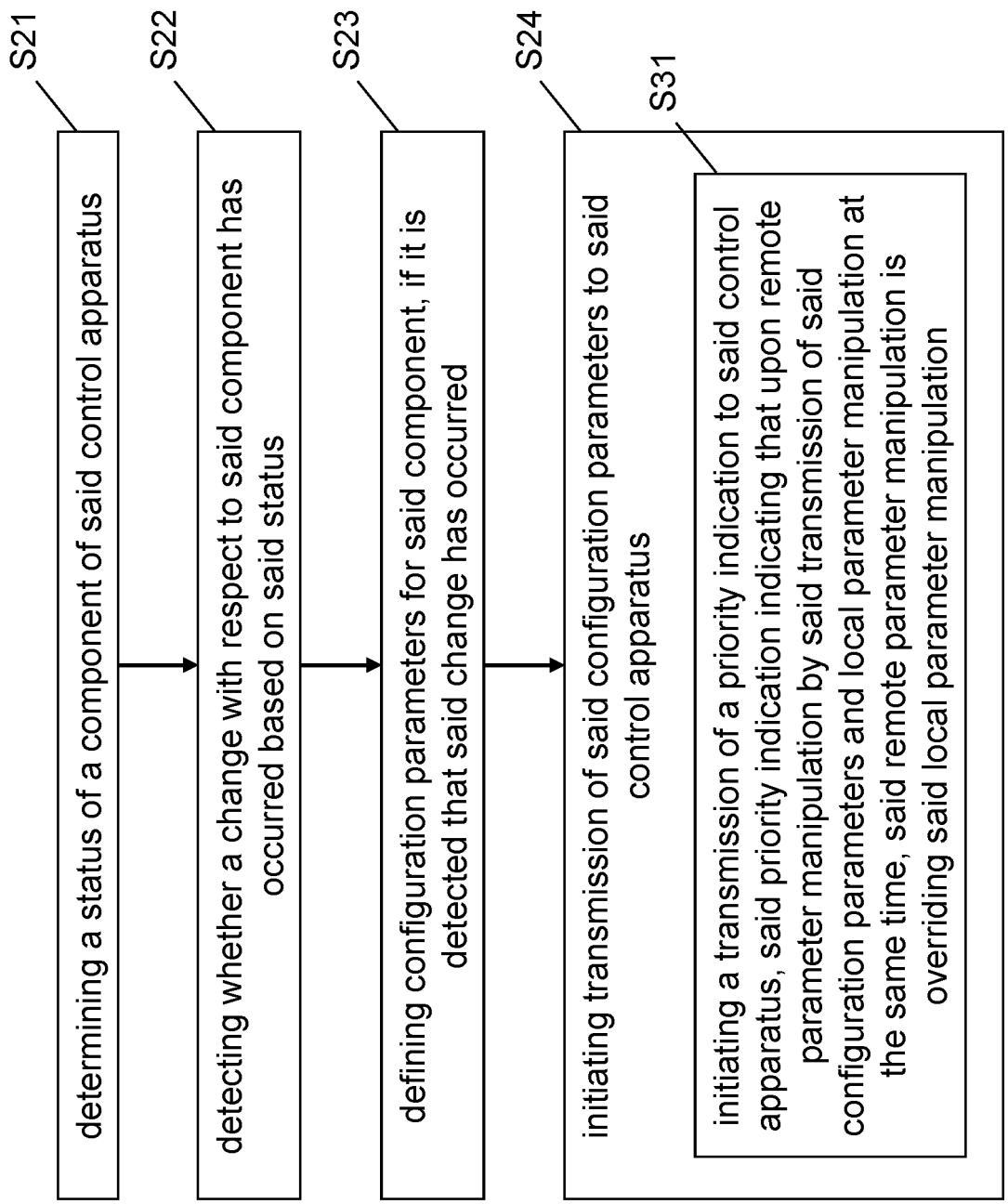
FIG. 3 is a schematic diagram of a procedure according to exemplary embodiments of the present invention.

Furthermore, a system according to embodiments of the present invention comprises a device (remote management device 10) as shown in FIG. 1 which is configured to carry out the method shown in FIG. 2 or FIG. 3, and a control apparatus which is configured to control an elevator, an escalator, or automatic doors. In these embodiments, the control apparatus is further configured to receive the configuration parameters, and to effect a local parameter manipulation with respect to the component based on the configuration parameters.

The above-described procedures and functions may be implemented by respective functional elements, processors, or the like, as described below.

Figure 4:
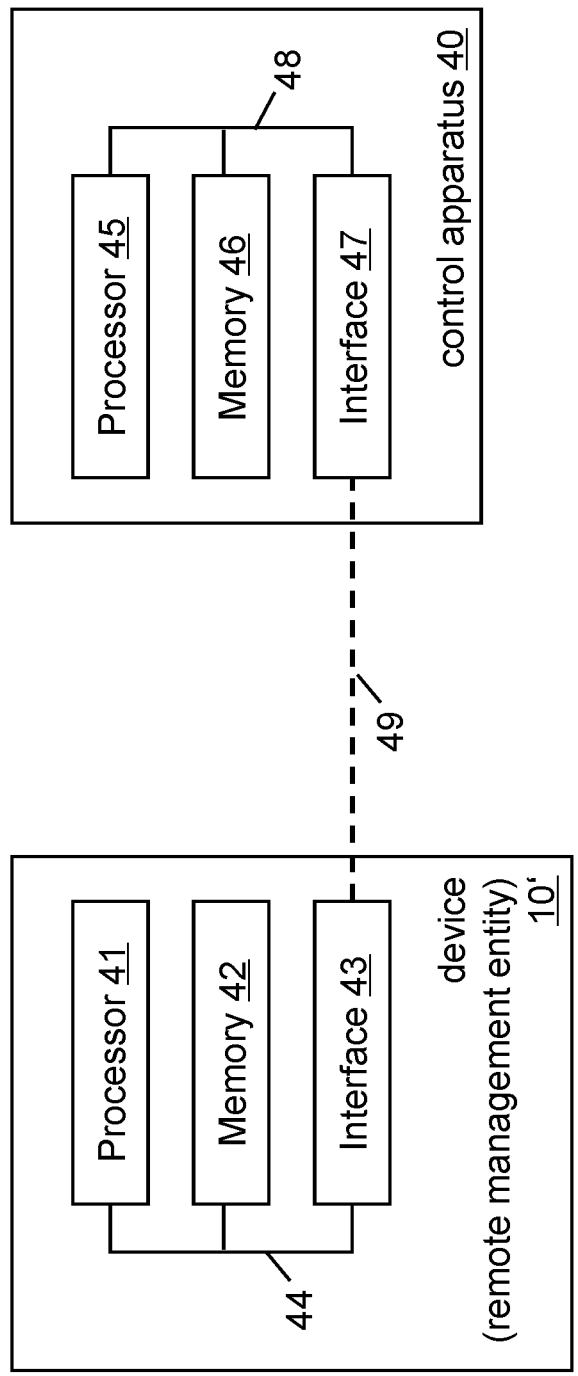
FIG. 4 is a block diagram alternatively illustrating apparatuses according to exemplary embodiments of the present invention.

In FIG. 4, an alternative illustration of apparatuses according to exemplary embodiments of the present invention is depicted. In particular, according to FIG. 4, the above-mentioned system comprising a remote management device 10' (corresponding to the remote management device 10 of FIG. 1) and a control apparatus 40 of an elevator (escalator, automatic doors).

According to exemplary embodiments of the present invention, the apparatus representing the remote management device 10' comprises at least one processor 41, at least one memory 42 including computer program code, and at least one interface 43 configured for communication with at least another apparatus, which are connected by a bus 44 or the like. Further, an apparatus representing the control apparatus 40 comprises at least one processor 45, at least one memory 46 including computer program code, and at least one interface 47 configured for communication with at least another apparatus, which are connected by a bus 48 or the like. The remote management device 10' and the control apparatus 40 may be connected via link 49, respectively.

The processor (i.e. the at least one processor 41, with the at least one memory 42 and the computer program code) of the remote management device 10' is configured to perform determining a status of a component of said control apparatus (thus the apparatus comprising corresponding means for determining), to perform detecting whether a change with respect to said component has occurred based on said status (thus the apparatus comprising corresponding means for detecting), to perform defining configuration parameters for said component, if it is detected that said change has occurred (thus the apparatus comprising corresponding means for defining), and to perform initiating transmission of said configuration parameters to said control apparatus (thus the apparatus comprising corresponding means for initiating).

Further, the processor (i.e. the at least one processor 45, with the at least one memory 46 and the computer program code) of the control apparatus 40 is configured to perform receiving said configuration parameters (thus the apparatus comprising corresponding means for receiving), and to perform effecting a local parameter manipulation with respect to the component based on the configuration parameters (thus the apparatus comprising corresponding means for effecting).

For further details regarding the operability/functionality of the individual apparatuses, reference is made to the above description in connection with any one of FIGS. 1 to 3, respectively.

Hence, according to embodiments of the present invention, manual phases (which need to be executed after every parameter change) can be discarded, while a most recent parameter set can be restored fast and without manual intervention. Furthermore, predictability and repeatability regarding a resulting configuration of a control apparatus can be improved for the case that this configuration can be modified by means of multiple ways of access and interfaces in parallel.

Therefore, the effort for maintenance of e.g. an elevator and the downtime of such elevator can be reduced.

Embodiments of the present invention are not limited to the details of the embodiments as described above, and various modifications are possible.

For example, the control apparatus and in particular the component thereof may be provided separately from a control device carrying out the overall control of the elevator, or may be part of a plurality of control units commonly carrying out the control of the elevator. Alternatively, the control apparatus may be part of a main control device carrying out the overall control of the elevator.

Further, the remote management device 10 may be responsible only for the management of an associated elevator. However, the remote management device may also be part of a management main unit carrying out management of a plurality of elevators.

According to some embodiments as described above, control and management of an elevator is described. However, embodiments of the present invention are not limited to this. For example, the control and management may also be applied to an escalator or automatic doors or similar equipment. In this case, also the advantage can be achieved that the effort for maintenance of such escalator or automatic doors (or similar equipment) and the downtime of such escalator or automatic doors can be reduced.

It is to be understood that any of the above modifications can be applied singly or in combination to the respective aspects and/or embodiments to which they refer, unless they are explicitly stated as excluding alternatives.

Furthermore, elevator (escalator or automatic doors) system elements, in particular operation elements, control elements (e.g., the remote management device, the control apparatus) or detection elements, as well as corresponding functions as described herein, and other elements, functions or applications may be implemented by software, e.g. by a computer program product for a computer, and/or by hardware. For executing their respective functions, correspondingly used devices, elements or functions may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means etc.) and the like. It is to be noted that in the present specification processing portions should not be only considered to represent physical portions of one or more processors, but may also be considered as a logical division of the referred processing tasks performed by one or more processors.

For the purpose of the present invention as described herein above, it should be noted that embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, a device may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. A method for remote managing a control apparatus controlling an elevator, an escalator, or automatic doors, the method comprising the steps of:

periodically saving parameters including configuration parameters of said control apparatus of the elevator, escalator or automatic doors to a configuration information storage, being part of or accessible by a remote management device, via remote connectivity;

determining a status of a control component of said control apparatus of the elevator, escalator, or automatic doors;

receiving by the remote management device, from said control apparatus, local configuration parameters for a replacement component;

detecting and determining whether a change with respect to said component has occurred based on said status, said change being a replacement of said component by said replacement component, wherein it is determined that said change has occurred when said local configuration parameters differ from latest configuration parameters stored in said configuration information storage by at least a predetermined difference;

defining configuration parameters for said replacement component, when it is detected that said change has occurred, comprising the step of the remote management device retrieving said latest configuration parameters from said configuration information storage;

initiating transmission of said latest configuration parameters to said control apparatus, comprising the step of automatically downloading said latest configuration parameters to said replacement component; and performing a remote re-configuration of said replacement component, when said change is detected.

2. The method according to claim 1, further comprising the step of:

storing said local configuration parameters for said replacement component in said configuration information storage.

3. The method according to claim 1, wherein said component is any of a software component or a hardware component of said control apparatus.

4. The method according to claim 1, wherein when initiating said transmission, said method further comprises the step of initiating a transmission of a priority indication to said control apparatus, said priority indication indicating that upon remote parameter manipulation by said transmission of said latest configuration parameters and local parameter manipulation occurring at the same time, said remote parameter manipulation is overriding said local parameter manipulation.

5. A computer program product comprising computer-executable computer program code which, when the computer-executable computer program code is run on a computer, is configured to cause the computer to carry out the method according to claim 1, wherein the computer program product is embodied on a non-transitory computer-readable medium on which the computer-executable computer program code is stored, and/or wherein the computer program product is directly loadable into an internal non-transitory memory of the computer or a processor thereof.

6. A device for remote managing a control apparatus controlling an elevator, an escalator, or automatic doors, the device comprising:

determining circuitry configured to determine a status of a control component of said control apparatus;

receiving circuitry configured to receive, from said control apparatus, local configuration parameters for a replacement component;

detecting circuitry configured to detect and determine whether a change with respect to said component has occurred based on said status, said change being a replacement of said component by said replacement component, wherein it is determined that said change has occurred when said local configuration parameters differ from latest configuration parameters stored in a configuration information storage by at least a predetermined difference;

defining circuitry configured to define configuration parameters for said replacement component, when it is detected that said change has occurred;

retrieving circuitry configured to retrieve said latest configuration parameters for said replacement component from said configuration information storage, wherein configuration parameters of said control apparatus of the elevator, escalator or automatic door are periodically saved to said configuration information storage, being part of or accessible by a remote management device, via remote connectivity; and initiating circuitry configured to initiate transmission of said latest configuration parameters to said control apparatus, so that said latest configuration parameters are automatically downloaded to said replacement component; a remote re-configuration of said replacement component is performed, when said change is detected.

7. The device according to claim 6, further comprising:

storing circuitry configured to store said local configuration parameters for said replacement component in said configuration information storage.

8. The device according to claim 6, wherein said component is any of a software component or a hardware component of said control apparatus.

9. The device according to claim 6, further comprising said initiating circuitry configured to initiate a transmission of a priority indication to said control apparatus, said priority indication indicating that upon remote parameter manipulation by said transmission of said latest configuration parameters and local parameter manipulation occurring at the same time, said remote parameter manipulation is overriding said local parameter manipulation.

10. A system comprising:

the device according to claim 6; and said control apparatus controlling an elevator, an escalator, or automatic doors, wherein said control apparatus is configured to receive said latest configuration parameters, and to effect a local parameter manipulation with respect to said replacement component based on said latest configuration parameters.

* * * * *